(12) United States Patent
Allen et al.

(10) Patent No.: US 11,183,903 B2
(45) Date of Patent: Nov. 23, 2021

(54) INNER ROTOR MOTOR WITH HOLLOW WIRING TUBE INSIDE ROTOR SHAFT

(71) Applicant: Nidec Motor Corporation, St. Louis, MO (US)

(72) Inventors: Matthew D. Allen, Saint Peters, MO (US); Aaron Davies, Edwardsville, IL (US); Daniel J. Suda, St. Louis, MO (US); Philip S. Johnson, Granite City, IL (US); Michael W. Major, Moro, IL (US)

(73) Assignee: Nidec Motor Corporation, St. Louis, MO (US)

( * ) Notice: Subject to any disclaimer, the term of this patent is extended or adjusted under 35 U.S.C. 154(b) by 124 days.

(21) Appl. No.: 16/691,714

(22) Filed: Nov. 22, 2019

(65) Prior Publication Data

US 2020/0389065 A1    Dec. 10, 2020

Related U.S. Application Data

(60) Provisional application No. 62/857,605, filed on Jun. 5, 2019.

(51) Int. Cl.
*H02K 7/14* (2006.01)
*H02K 5/22* (2006.01)
(Continued)

(52) U.S. Cl.
CPC ......... *H02K 5/225* (2013.01); *F04D 25/0693* (2013.01); *F04D 25/088* (2013.01);
(Continued)

(58) Field of Classification Search
CPC ........ H02K 5/225; H02K 7/003; H02K 7/083; H02K 7/14; H02K 11/0094; H02K 21/16;
(Continued)

(56) References Cited

U.S. PATENT DOCUMENTS 5,484,120 A * 1/1996 Blakeley ............... F03D 9/25
244/54
6,433,451 B1 * 8/2002 Cherciu .............. A61P 31/12
310/115

(Continued)

FOREIGN PATENT DOCUMENTS

| CN | 202918093 | 5/2013 |
| WO | 2009055815 | 4/2009 |

OTHER PUBLICATIONS

International Search Report and Written Opinion from PCT Application No. PCT/US2020/032603 entitled: Inner Rotor Motor With Hollow Wiring Tube Inside Rotor Shaft (dated Aug. 27, 2020).

*Primary Examiner* — Terrance L Kenerly
(74) *Attorney, Agent, or Firm* — Hovey Williams LLP

(57) ABSTRACT

An apparatus includes an inner rotor motor and a stationary wiring conduit. The inner rotor motor includes a stator and a rotor spaced at least in part radially inside the stator. The rotor is rotatable relative to the stator about an axis. The rotor includes a rotatable shaft that presents a shaft bore extending axially therethrough. The stationary wiring conduit extends through the shaft bore and is fixed relative to the motor housing. The shaft bore rotatably receives the wiring conduit, such that the wiring conduit is permitted to remain stationary as the shaft rotates.

20 Claims, 6 Drawing Sheets

(51) Int. Cl.
*H02K 7/00* (2006.01)
*H02K 7/08* (2006.01)
*H02K 21/16* (2006.01)
*F04D 25/06* (2006.01)
*F04D 25/08* (2006.01)
*H02K 11/00* (2016.01)
*F21V 33/00* (2006.01)

(52) U.S. Cl.
CPC .............. *H02K 7/003* (2013.01); *H02K 7/083* (2013.01); *H02K 7/14* (2013.01); *H02K 11/0094* (2013.01); *H02K 21/16* (2013.01); *F21V 33/00* (2013.01)

(58) Field of Classification Search
CPC .......... H02K 3/24; H02K 17/22; F21V 33/00; F04D 25/0693; F04D 25/088
USPC ............................................ 310/61, 60 A, 71
See application file for complete search history.

(56) References Cited

U.S. PATENT DOCUMENTS

| | | |
|---|---|---|
| 8,876,468 B2 | 11/2014 | Aynsley et al. |
| 2002/0135255 A1 | 9/2002 | Williams et al. |
| 2009/0208333 A1* | 8/2009 | Smith .................... F04D 27/008 416/5 |
| 2010/0104445 A1* | 4/2010 | Aynsley ................ F04D 29/388 416/223 R |
| 2013/0209293 A1 | 8/2013 | Kawano et al. |
| 2014/0300255 A1 | 10/2014 | Sugiyama et al. |
| 2015/0377241 A1 | 12/2015 | Hoeman |

* cited by examiner

INNER ROTOR MOTOR WITH HOLLOW WIRING TUBE INSIDE ROTOR SHAFT

CROSS-REFERENCE TO RELATED APPLICATIONS

This application claims the benefit of U.S. Provisional Application Ser. No. 62/857,605, filed Jun. 5, 2019, entitled INNER ROTOR MOTOR WITH HOLLOW WIRING TUBE INSIDE ROTOR SHAFT, which is hereby incorporated in its entirety by reference herein.

BACKGROUND

1. Field

The present invention relates generally to an electric motor having a stationary wiring conduit that extends through the motor. Furthermore, embodiments of the present invention concern an inner rotor motor having a rotor with a rotatable shaft and a stationary wiring conduit that is fixed relative to the motor housing and is rotatably received within a bore of the shaft.

2. Discussion of Prior Art

Powered fans are commonly installed in residential and industrial applications to facilitate air circulation within a large area. In the usual manner, it is typical for a powered fan to be supported below a roof or ceiling structure so that the fan can spin about a vertical axis. In some applications, a high-volume, low-speed (HVLS) powered fan is provided. Conventional HVLS fans are normally used in industrial applications and have fan diameters that are relatively larger than residential ceiling fans.

Conventional powered fans have certain deficiencies. For instance, conventional HVLS fans often do not provide a lighting fixture. Although residential ceiling fans incorporate lighting fixtures, prior art residential ceiling fans have insufficient power, size, and durability to operate reliably in industrial environments.

This background discussion is intended to provide information related to the present invention which is not necessarily prior art.

SUMMARY

The following brief summary is provided to indicate the nature of the subject matter disclosed herein. While certain aspects of the present invention are described below, the summary is not intended to limit the scope of the present invention.

Embodiments of the present invention provide an inner rotor motor assembly that does not suffer from the problems and limitations of the prior art devices, including those set forth above.

A first aspect of the present invention concerns an apparatus that broadly includes an inner rotor motor and a stationary wiring conduit. The inner rotor motor includes a stator and a rotor spaced at least in part radially inside the stator. The rotor is rotatable relative to the stator about an axis. The rotor includes a rotatable shaft that presents a shaft bore extending axially therethrough. The stationary wiring conduit extends through the shaft bore. The shaft bore rotatably receives the wiring conduit, such that the wiring conduit is permitted to remain stationary as the shaft rotates.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Preferred embodiments of the invention are described in detail below with reference to the attached drawing figures, wherein:

FIG. 1 is a fragmentary, partially sectioned view of a powered fan system constructed in accordance with a preferred embodiment of the present invention, showing an inner rotor motor, a fan wheel, a stationary mounting structure, a wiring conduit, and an accessory kit, with the wiring conduit extending axially through a motor shaft of the inner rotor motor, and a wiring harness of the accessory kit extending through the wiring conduit;

Figure 5:
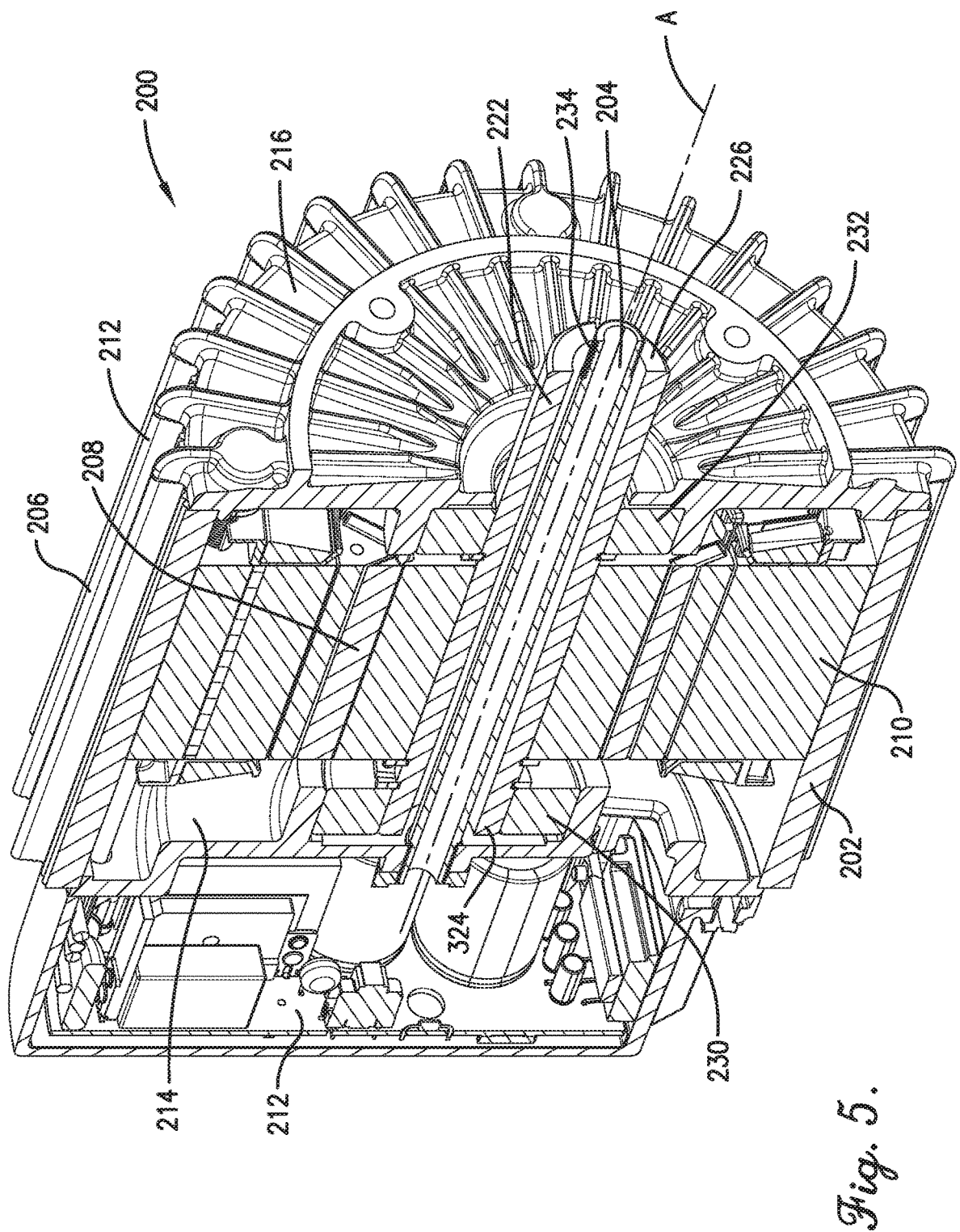
Figure 6:
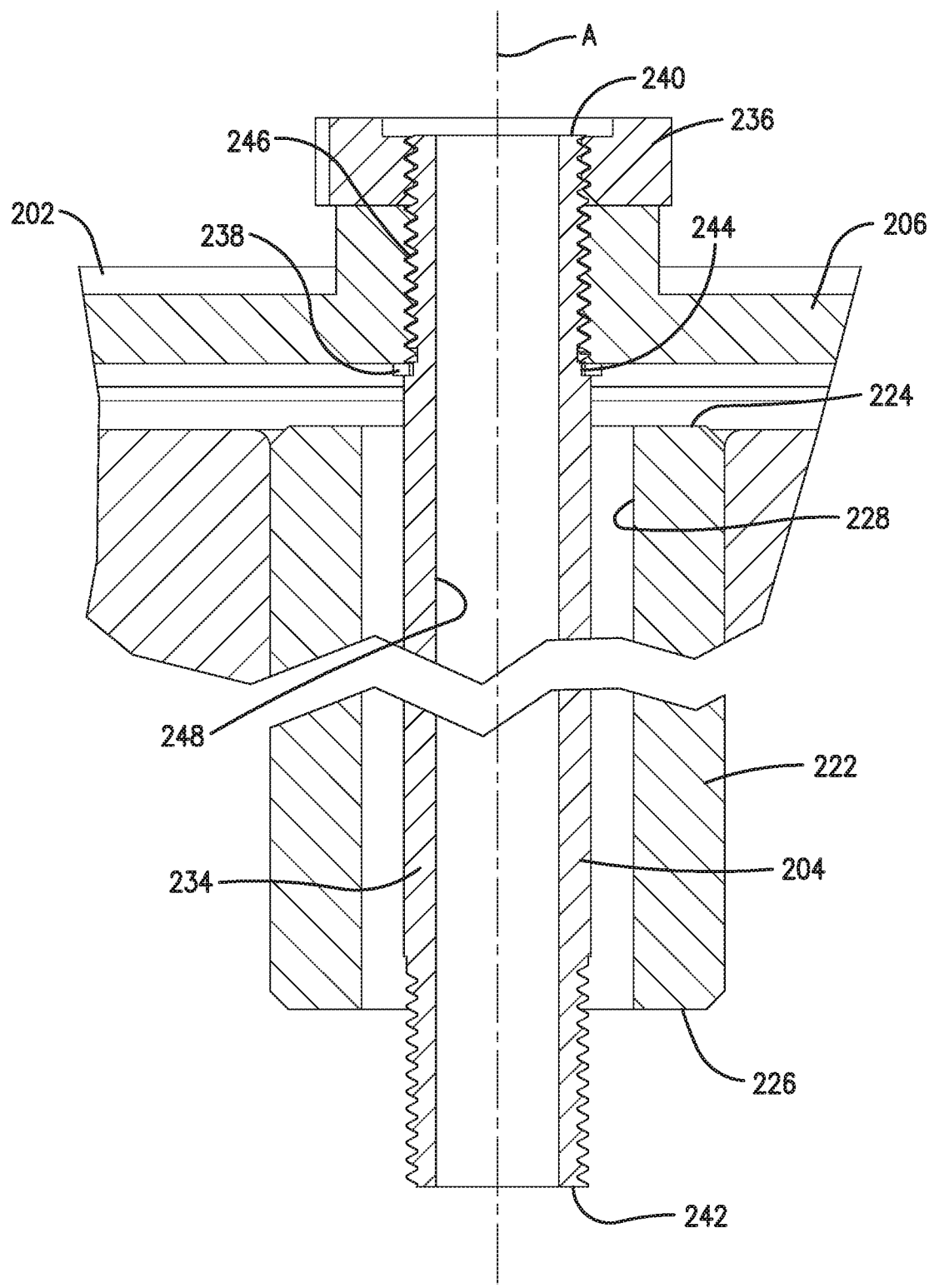

FIG. 5 is a fragmentary perspective of an inner rotor motor and wiring conduit constructed in accordance with an alternative embodiment of the present invention, showing the motor and wiring conduit cross-sectioned to depict the wiring conduit received within the motor shaft; and FIG. 6 is an enlarged fragmentary cross section of the inner rotor motor and wiring conduit shown in FIG. 5, depicting an upper end of the wiring conduit attached to an upper endshield of the motor and also depicting the wiring conduit spaced within the motor shaft, so that the motor shaft can rotate relative to the wiring conduit.

The drawing figures do not limit the present invention to the specific embodiments disclosed and described herein. While the drawings do not necessarily provide exact dimensions or tolerances for the illustrated components or structures, the drawings, not including any purely schematic drawings, are to scale with respect to the relationships between the components of the structures illustrated therein.

DETAILED DESCRIPTION OF THE PREFERRED EMBODIMENTS

Figure 1:
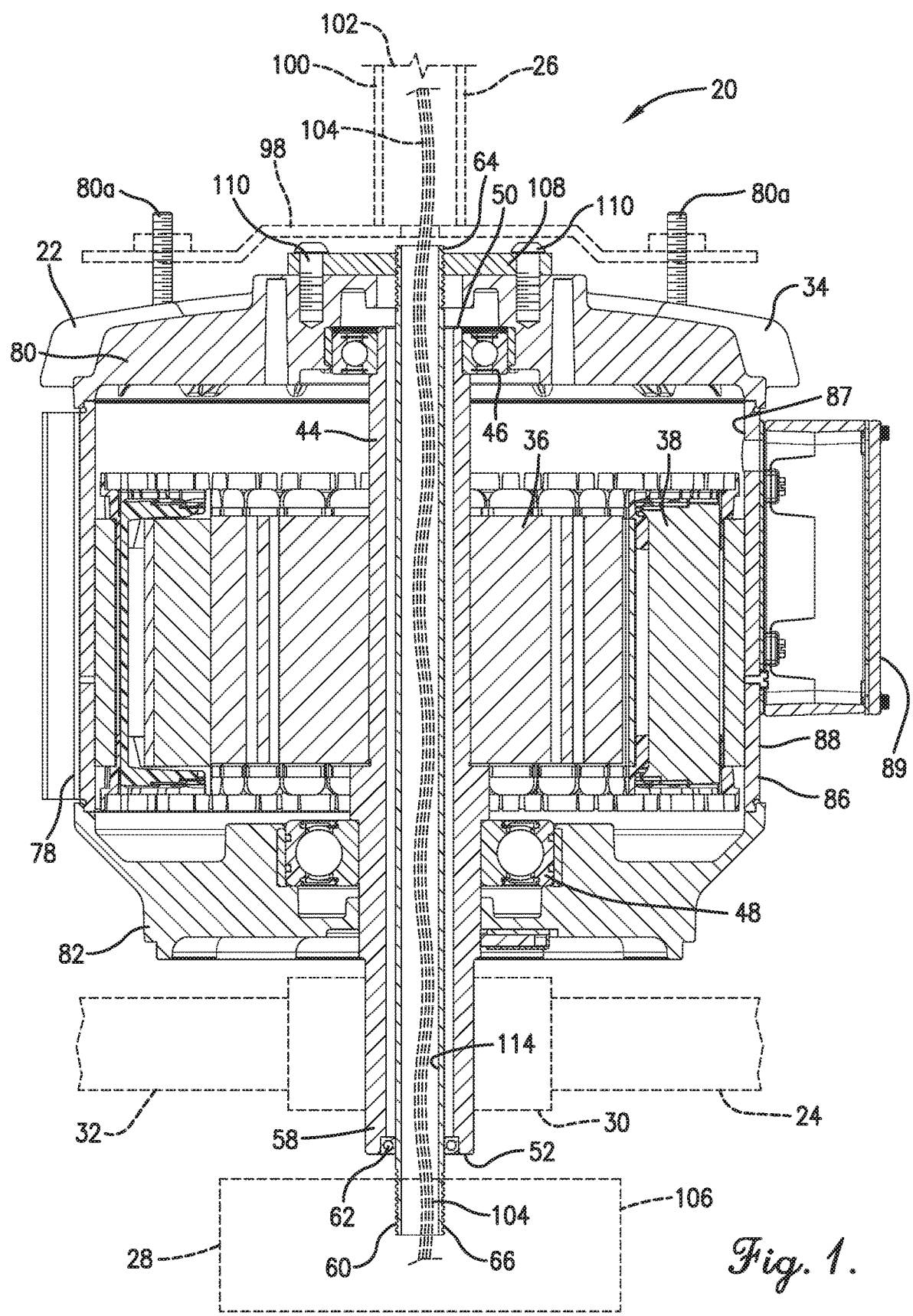

Turning to FIG. 1, a powered fan system 20 is constructed in accordance with a preferred embodiment of the present invention. The powered fan system 20 is preferably supported for operation below a roof or ceiling structure (not shown) to facilitate air circulation within the area below the powered fan system 20 and provide lighting. It will be appreciated that the system 20 can be used, alternatively or additionally, to power one or more other devices within the scope of the present invention. For example, according to some aspects of the present invention, principles of the invention may be used in other (non-fan) applications.

In the illustrated embodiment, the powered fan system 20 includes an inner rotor motor 22, a rotatable fan wheel 24, a stationary mounting structure 26, and an accessory kit 28. It will be understood that the rotatable fan wheel 24, stationary mounting structure 26, and accessory kit 28 are depicted schematically in FIG. 1. The powered fan system 20 is preferably oriented such that a rotational shaft axis A extends vertically. However, it is permissible according to some aspects of the present invention for the electric motor to be alternatively oriented. As will be explained, the disclosed accessory kit 28 is preferably operable to provide a lighting fixture in a location generally below the fan wheel 24.

The powered fan system 20 preferably comprises a high-volume, low-speed (HVLS) powered fan. The fan wheel 24 is preferably mounted on the rotor shaft to provide HVLS operation and includes a fan hub 30 and radially extending fan blades 32. As part of the HVLS fan, the fan wheel 24 preferably presents an outermost fan diameter dimension that ranges from about eight feet (8') to about twenty-four (24'), although certain aspects of the present invention contemplate the outermost fan diameter dimensions outside this range. Furthermore, the fan wheel 24 is preferably rotatable by the inner rotor motor 22 at a fan rotational speed that ranges from about fifty revolutions per minute (50 rpm) to about two hundred revolutions per minute (200 rpm). Alternative speeds are within the ambit of certain aspects of the present invention, particularly when the motor is used in non-fan applications.

It is entirely within the ambit of the present invention where features of the disclosed inner rotor motor and/or accessory kit are used in connection with various types of powered fan systems, such as residential powered fans. Also, although the fan wheel is directly attached to the rotor shaft, the fan wheel could be indirectly connected to the rotor shaft by a transmission (e.g., a gear box). Furthermore, features of the disclosed inner rotor motor and/or accessory kit could be used in other applications where the inner rotor motor drives a mechanism other than a fan.

Turning to FIGS. 1-4, the inner rotor motor 22 comprises an electric motor and is configured for use in various conditions and applications. The inner rotor motor 22 broadly includes a motor housing 34, a rotor 36, and a stator 38 (see FIG. 2). The rotor 36 is preferably rotatable about the rotational shaft axis A (see FIG. 2). In preferred embodiments, the rotor 36 is spaced at least in part radially inside the stator 38. As a result, the depicted stator 38 substantially circumscribes at least part of the rotor 36.

Figure 2:
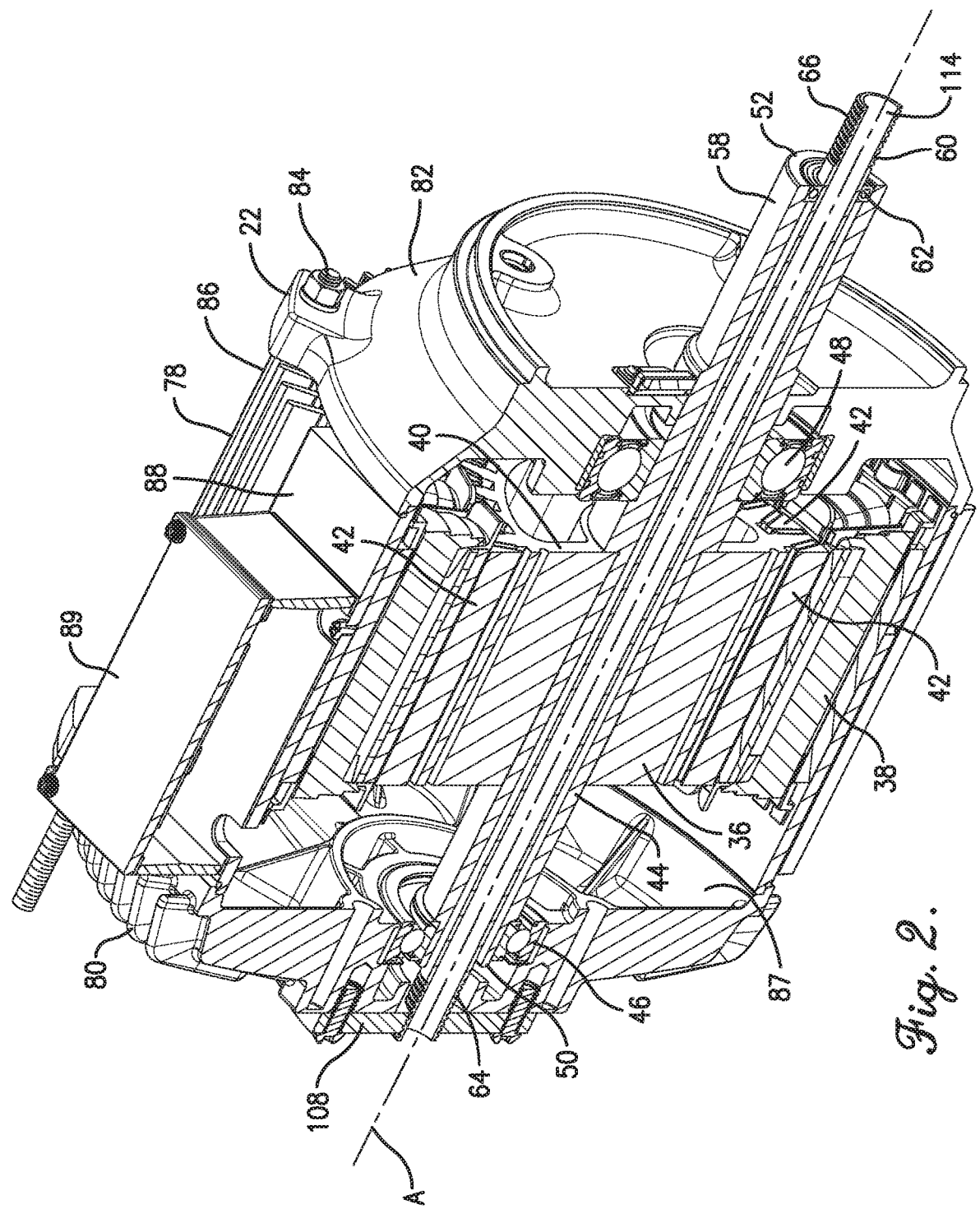
FIG. 2 is a fragmentary perspective of the inner rotor motor and wiring conduit shown in FIG. 1, with the motor and wiring conduit being cross-sectioned to show the wiring conduit received within the motor shaft.

The illustrated rotor 36 preferably includes a rotor core 40, a plurality of magnets 42, and a motor shaft 44 defining the shaft axis A for the rotor 36 (see FIG. 2). The rotor core 40 and magnets 42 are generally located within the motor housing 34. The motor shaft 44 is rotatably supported relative to the motor housing 34 to rotate about the shaft axis A. More specifically, the motor shaft 44 is rotatably supported by upper and lower shaft bearings 46 and 48 (see FIG. 1). In the preferred embodiment, the rotor weight is generally shared by the upper and lower shaft bearings 46 and 48.

As previously noted, the inner rotor motor 22 is preferably configured to drive the rotor 36 and the motor shaft 44 at a rotational speed that ranges from about fifty revolutions per minute (50 rpm) to about two hundred revolutions per minute (200 rpm), although alternative speeds are within the ambit of certain aspects of the present invention.

The depicted motor shaft 44 has a generally tubular structure that is configured to operably receive a wiring conduit and a portion of the accessory kit 28 (as will be described). The motor shaft 44 preferably includes upper and lower shaft ends 50,52, an outer shaft surface 54, and a continuous shaft bore 56 extending along the length of the motor shaft 44 (see FIGS. 3 and 4). The motor shaft 44 is positioned so that the upper shaft bearing 46 receives the upper shaft end 50 and the lower shaft bearing 48 is located between the upper and lower shaft ends 50,52.

The motor shaft 44 also preferably includes an exposed portion 58 that is exposed relative to the exterior of the motor housing 34 (see FIG. 1). The exposed portion 58 is configured to drivingly engage the fan wheel 24.

The exposed portion 58 is preferably cantilevered relative to the motor housing 34 such that the lower shaft end 52 is spaced from the motor housing 34 (see FIG. 2). However, for some aspects of the present invention, the motor shaft could have an exposed portion alternatively located along the length of the shaft (e.g., where the exposed portion is spaced between the ends of the shaft and, more optionally, between the shaft bearings such that the exposed portion is along a non-cantilevered portion of the shaft).

Again, the outer shaft surface 54 of the motor shaft 44 preferably receives the fan wheel 24 (see FIG. 1). Preferably, the motor shaft 44 of the rotor 36 defines the output shaft of the inner rotor motor 22. It will be appreciated, however, that certain aspects of the present invention contemplate the motor output shaft not being the rotor shaft. For example, the inner rotor motor may alternatively be provided with a transmission (e.g., a gear drive) between the rotor shaft and output shaft, with the shafts being drivingly connected but otherwise discrete and spaced apart.

The powered fan system 20 also preferably includes a stationary wiring conduit 60 and a conduit bearing 62 to support the wiring conduit 60. The tubular conduit 60 preferably comprises a continuous metal tube with threaded upper and lower conduit ends 64,66.

Figure 4:
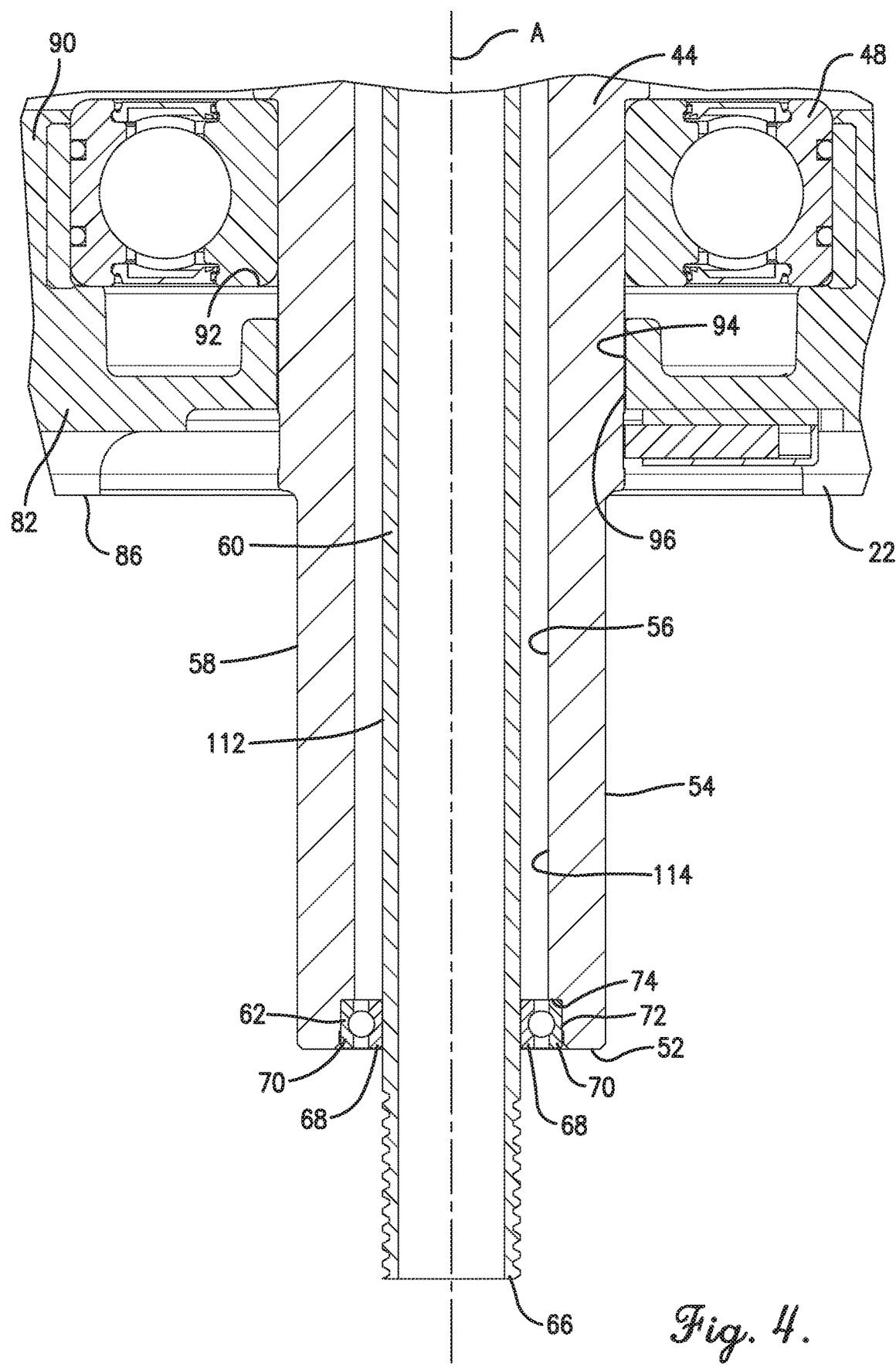
FIG. 4 is an enlarged fragmentary cross section of the inner rotor motor and wiring conduit shown in FIGS. 1-3, depicting the motor shaft rotatably supported by a lower shaft bearing adjacent the lower end of the motor shaft and also depicting a conduit bearing mounted in the lower end of the motor shaft to support the wiring conduit.

The depicted conduit bearing 62 comprises a ball bearing that includes inner and outer races 68,70 (see FIG. 4). The conduit bearing 62 is preferably sized so that the outer race 70 is press fit into a groove 72 in the lower shaft end 52 and engages a shoulder 74 presented by the motor shaft 44 (see FIG. 4).

The motor housing 34 preferably includes a shell 78, upper and lower endshields 80,82, and fasteners 84 (see FIG. 2). The housing 34 also presents an exterior motor surface 86 and an internal motor chamber 88. The motor chamber 88 at least substantially receives the rotor 36 and the stator 38 (see FIGS. 1 and 2).

In a preferred embodiment, the shell 78 extends generally circumferentially about the stator 38. The shell 78 also presents a flat mounting surface 88 to receive a box 89 (see FIGS. 1 and 2). It is permissible according to some aspects of the present invention, however, for the shell to extend in such a manner as to have an alternative cross-sectional shape, in contrast to the preferred generally cylindrical form, or to otherwise have alternative side surfaces.

The upper and lower endshields 80 and 82 preferably support respective upper and lower shaft bearings 46 and 48. The depicted upper and lower endshields 80 and 82 are preferably secured to the shell 78 by means of the fasteners 84. However, it is within the ambit of the present invention where the housing has an alternative shell and/or alternative endshields. Furthermore, the shell and endshields could be alternatively secured to one another. For some aspects of the present invention, the motor could also be configured for use without the shell and/or endshields.

Figure 3:
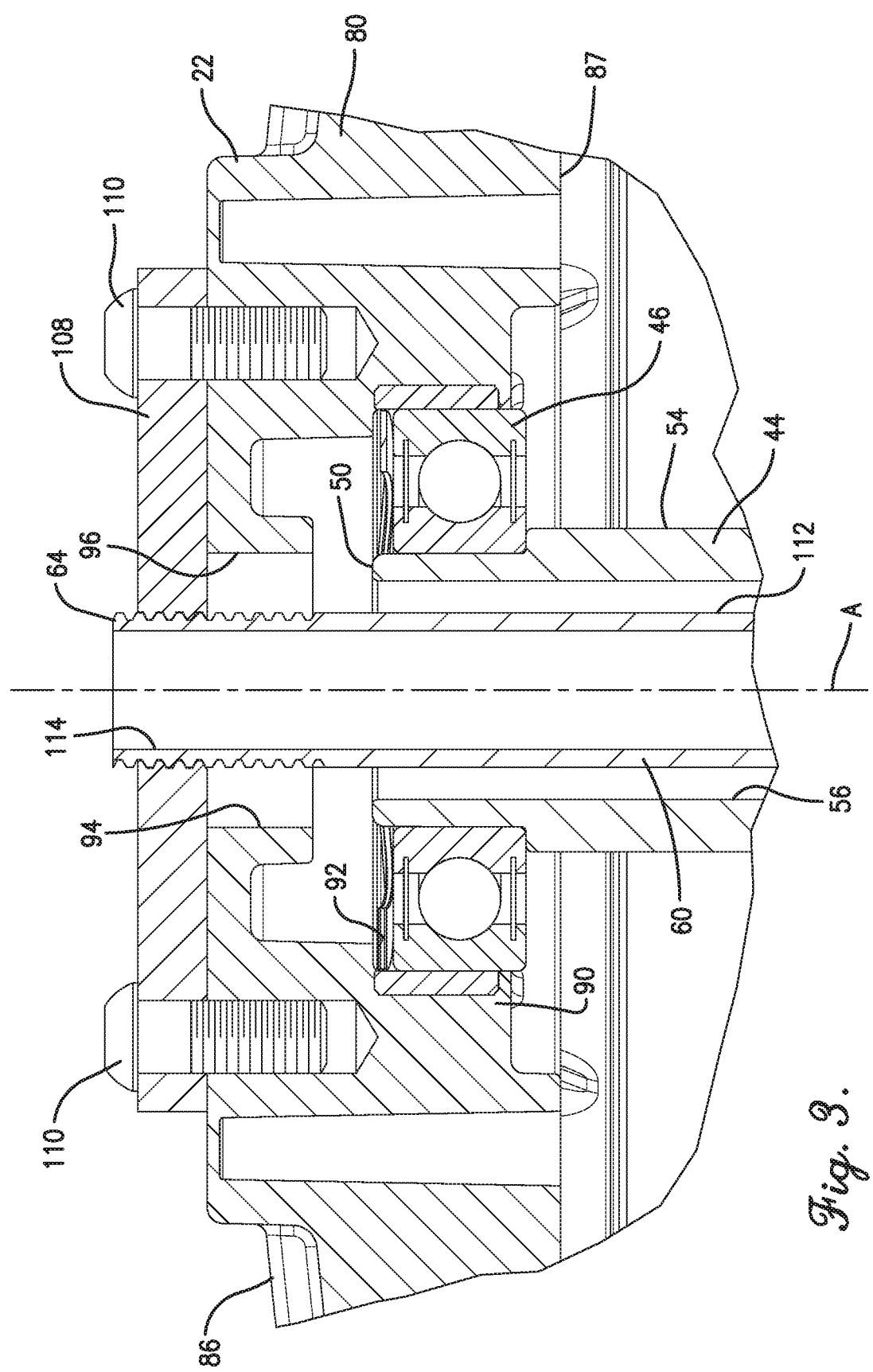
FIG. 3 is an enlarged fragmentary cross section of the inner rotor motor and wiring conduit shown in FIGS. 1 and 2, depicting an upper end of the motor shaft rotatably supported by an upper shaft bearing and further depicting an upper end of the wiring conduit attached to an upper endshield of the motor, with the wiring conduit being permitted to remain stationary as the motor shaft rotates.

In the illustrated embodiment, the upper and lower endshields 80 and 82 each include a bearing housing 90 that presents a bearing pocket 92 (see FIGS. 3 and 4). The bearing pockets 92 receive respective upper and lower shaft bearings 46 and 48 (see FIGS. 3 and 4). The endshields 80 and 82 also present relief openings 94 (see FIGS. 3 and 4). The bearing pocket 92 and the respective relief opening 94 cooperatively provide a shaft opening 96 that permits the motor shaft 44 to extend at least partly through the upper endshield 80 and entirely through the lower endshield 82 of the motor housing 34 (see FIGS. 3 and 4).

Again, the bearings 46,48 preferably cooperatively rotatably support the motor shaft 44. However, alternative or additional bearings, supports, or shaft supports may be provided without departing from the scope of the present invention.

The mounting structure 26 is configured to support the inner rotor motor 22, the fan wheel 24, and the accessory kit 28 during operation. In the depicted embodiment, the mounting structure 26 includes a bracket 98 and an upright extension tube 100 (see FIG. 1). The bracket 98 and tube 100 cooperatively present a wiring passage 102 receiving an electrical wiring harness 104 (see FIG. 1). The bracket 98 is removably attached to threaded fasteners 80*a* associated with the upper endshield 80 (see FIG. 1).

In the usual manner, the mounting structure 26 is preferably operable to be attached relative to a roof or ceiling structure. However, it is within the ambit of the present invention for the mounting structure to be alternatively configured (e.g., for attaching the powered fan system relative to another building structure). For certain aspects of the present invention, the powered fan system could be devoid of the illustrated mounting structure (for instance, where the inner rotor motor is configured to be mounted directly to a building structure, such as a building or other framework).

The illustrated accessory kit 28 preferably includes a stationary, powered accessory fixture 106, a mounting plate 108, and the wiring harness 104 (see FIG. 1). Again, the accessory kit 28 is operable to be positioned so that the powered accessory fixture 106 is located generally below the fan wheel 24. In the depicted embodiment, the wiring harness 104 extends from a location above the motor (e.g., adjacent the mounting structure 26), through the motor shaft 44, and to a location generally below the motor 22 and the fan wheel 24. Thus, the accessory kit 28 is operable to transmit electrical power from the location above the motor 22 to the location below the motor 22 and fan wheel 24 to power the fixture 106.

Most preferably, the accessory fixture 106 comprises a light fixture (not shown in detail) with a light coupled to the wiring harness 104. Although the accessory kit 28 is preferably configured to deliver power to the light fixture, the kit could be provided, additionally or alternatively, to supply power to one or more other electrical devices (e.g., an electrical outlet) located generally below the inner rotor motor 22 and the fan wheel 24.

The wiring conduit 60 is preferably configured to restrict the wiring harness 104 from contacting the motor shaft 44 and to support the powered accessory fixture 106. The wiring conduit 60 is installed to extend through the continuous shaft bore 56, such that the wiring conduit 60 and the wiring harness 104 are permitted to remain stationary as the motor shaft 44 rotates.

In the illustrated embodiment, the upper conduit end 64 of the conduit 60 is threaded into the mounting plate 108 (see FIG. 3). The mounting plate 108 is secured to the upper endshield 80 with fasteners 110 (see FIG. 3). Thus, the wiring conduit 60 is fixedly coupled to the upper endshield 80 so that the wiring conduit 60 is fixed relative to the stator 38 and generally remains stationary.

For certain aspects of the present invention, the wiring conduit could be alternatively fixed to remain stationary. For example, in alternative embodiments for which no motor housing is provided, the wiring conduit could be fixed to another structure.

Preferably, the wiring conduit 60 is also operably supported within the motor shaft 44 adjacent the lower conduit end 66 by the conduit bearing 62. Thus, in the depicted embodiment, the conduit bearing 62 is operably interposed between the motor shaft 44 and the wiring conduit 60. The depicted conduit bearing 62 is sized to provide a slip fit between an outer surface 112 of the conduit 60 and the inner race 68 of the conduit bearing 62 (see FIG. 4).

The illustrated wiring conduit 60 is preferably supported adjacent to the upper conduit end 64 by the mounting plate 108 and fasteners 110 and is also supported adjacent to the lower conduit end 66 by the conduit bearing. However, for certain aspects of the present invention, the wiring conduit can have an alternative support mechanism adjacent to one conduit end or adjacent to both conduit ends. As will be shown in an alternative embodiment, an alternative wiring conduit could be supported only adjacent to one of the conduit ends.

In the depicted embodiment, the conduit 60 is preferably spaced from the motor shaft 44. However, for certain aspects of the present invention, some negligible contact between the conduit and the motor shaft could occur (although it is most preferred that the conduit remains stationary).

The installed wiring conduit 60 is preferably mounted so as to be generally stationary while also permitting rotation of the motor shaft 44. The wiring conduit 60 presents a continuous conduit bore 114 that extends continuously between the conduit ends 64,66 and receives the wiring harness 104. The wiring harness 104 can be arranged to extend from a location above the motor 22 (e.g., adjacent the mounting structure 26), through the wiring conduit 60, and to a location generally below the motor 22 (see FIG. 1). In this manner, the wiring conduit 60 protects the wiring harness 104 and restricts the wiring harness 104 from contacting the motor shaft 44, particularly as the shaft 44 rotates.

In use, the powered fan system 20 is preferably installed within a building or other facility by attaching the mounting structure 26 relative to a roof or ceiling structure to support the inner rotor motor 22 above an area. The wiring conduit 60 is located in the shaft bore 56 and the conduit bearing 62 so that the upper conduit end 64 is adjacent the upper endshield 80 and the lower conduit end 64 is adjacent the conduit bearing 62. The wiring conduit 60 is secured by threading the upper conduit end 64 into the mounting plate 108 and attaching the mounting plate 108 to the upper endshield 80 with fasteners 110.

With the inner rotor motor 22 mounted above the area and the wiring conduit 60 installed, the accessory kit 28 can be operably installed by running the wiring harness 104 from a power source (e.g., a powered junction box) associated with the roof or ceiling. The wiring harness 104 is routed from the power source location, through the tube 100, through the wiring conduit 60, and to the accessory fixture 106.

Turning to FIGS. 5 and 6, an alternative powered fan system 200 is depicted. The remaining description will focus primarily on the differences of this alternative embodiment from the embodiment described above. The alternative powered fan system 200 preferably includes an inner rotor motor 202, a rotatable fan wheel (not shown), and a wiring conduit 204 alternatively supported on the motor 202.

The inner rotor motor 202 preferably includes a motor housing 206, a rotor 208, a stator 210, and a motor control assembly 212. The motor housing 206 operably receives (at least in substantial part) the rotor 208 and stator 210. The motor housing 206 includes a shell 212, an upper endshield 214, and a lower endshield 216.

The rotor 208 preferably includes a motor shaft 222 defining a shaft axis A for the rotor 208. The depicted motor shaft 222 has a generally tubular structure that is configured to operably receive the alternative accessory kit. The motor shaft 222 includes upper and lower shaft ends 224,226 and a continuous shaft bore 228 extending along the length of the motor shaft 222. The motor shaft 222 is positioned so that an upper shaft bearing 230 receives the upper shaft end 224 and a lower shaft bearing 232 is located between the upper and lower shaft ends 224,226.

The alternative powered fan system 200 is operable to provide a stationary accessory fixture (not shown) in a location generally below the fan wheel (not shown). Most preferably, the accessory fixture is a light fixture with a light coupled to an electrical wiring harness (not shown).

The alternative fan system 200 also preferably includes a tubular conduit 234, a mounting fastener 236, a retaining ring 238, and the electrical wiring harness (see FIG. 6). The conduit 234 is preferably installed to extend through the continuous shaft bore 228. The conduit 234 includes upper and lower conduit ends 240,242 and presents an outer groove 244 adjacent to threads 246 of the upper conduit end 240 (see FIG. 6).

The upper conduit end 240 of the conduit 234 is threaded into a wall of the upper endshield 214 so that the upper conduit end 240 is stationary. Preferably, the conduit 234 is also secured to the wall of the upper endshield 214 by the mounting fastener 236 and the retaining ring 238. The mounting fastener 236 comprises a threaded nut that is threaded onto the upper conduit end 240. The retaining ring 238 is removably mounted in the outer groove 244 of the conduit 234 on the opposite side of the upper endshield 214. The mounting fastener 236 and retaining ring 238 cooperatively secure the conduit 234 to the upper endshield 214 while restricting off-axis movement of the conduit 234 within the shaft 222.

In contrast to the preferred embodiment described above, the fan system 200 is preferably devoid of a bearing between the shaft 222 and the conduit 234. That is, the conduit 234 is preferably supported adjacent to only the upper conduit end 240.

The depicted conduit 234 is preferably mounted so as to be generally stationary while also permitting rotation of the motor shaft 222. The conduit 234 presents a continuous conduit bore 248 that receives the wiring harness. The wiring harness can be arranged to extend from a location above the motor 222, through the conduit 234, and to a location generally below the motor. In this manner, the conduit 234 protects the wiring and restricts the wiring from contacting the shaft 222, particularly as the shaft 222 rotates.

Although the above description presents features of preferred embodiments of the present invention, other preferred embodiments may also be created in keeping with the principles of the invention. Such other preferred embodiments may, for instance, be provided with features drawn from one or more of the embodiments described above. Yet further, such other preferred embodiments may include features from multiple embodiments described above, particularly where such features are compatible for use together despite having been presented independently as part of separate embodiments in the above description.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and assess the reasonably fair scope of the present invention as pertains to any apparatus not materially departing from but outside the literal scope of the invention as set forth in the following claims.

The invention claimed is:

1. An apparatus comprising:
   an inner rotor motor including
      a stator and a rotor spaced at least in part radially inside the stator,
      said rotor being rotatable relative to the stator about an axis;
      said rotor including a rotatable shaft that presents a shaft bore extending axially therethrough; and
   a stationary wiring conduit that extends continuously through the shaft bore,
   said wiring conduit being spaced within the rotatable shaft, with the shaft bore and wiring conduit cooperatively defining an annular gap along substantially the entire length of the rotatable shaft,
   said shaft bore rotatably receiving the wiring conduit, such that the wiring conduit is permitted to remain stationary as the shaft rotates.

2. The apparatus as claimed in claim 1,
   said wiring conduit being fixed relative to the stator.

3. The apparatus as claimed in claim 2, further comprising:
   a conduit bearing operably interposed between the rotatable shaft and the wiring conduit.

4. The apparatus as claimed in claim 3,
   said wiring conduit presenting first and second conduit ends,
   said wiring conduit being attached relative to the stator adjacent the first conduit end and supported by the conduit bearing adjacent the second conduit end.

5. The apparatus as claimed in claim 1, further comprising:
   an accessory kit including a wire harness that extends through the wiring conduit.

6. The apparatus as claimed in claim 5,
   said accessory kit including a powered accessory fixture coupled to the wire harness.

7. The apparatus as claimed in claim 6,
   said powered accessory fixture including a light.

8. The apparatus as claimed in claim 6,
   said wiring conduit presenting first and second conduit ends,
   said wiring conduit being attached relative to the stator adjacent the first conduit end, said powered accessory fixture being supported by the wiring conduit adjacent the second conduit end.

9. The apparatus as claimed in claim 6, further comprising:
a fan including a hub and fan blades supported by the hub,
said fan being mounted on and rotatable with the rotatable shaft, with the wiring conduit passing through the hub.

10. The apparatus as claimed in claim 1,
said inner rotor motor including a motor housing in which the stator and rotor are at least partly housed,
said motor housing including opposite first and second endshields and a shell extending therebetween.

11. The apparatus as claimed in claim 10,
said wiring conduit being fixedly coupled to the first endshield and extending through the second endshield.

12. The apparatus as claimed in claim 11, further comprising:
a conduit bearing operably interposed between the rotatable shaft and the wiring conduit.

13. The apparatus as claimed in claim 12,
said wiring conduit presenting first and second conduit ends corresponding to the first and second endshields,
said wiring conduit being attached relative to the first endshield adjacent the first conduit end and supported by the conduit bearing adjacent the second conduit end.

14. The apparatus as claimed in claim 11, further comprising:
an accessory kit including a wire harness that extends through the wiring conduit.

15. The apparatus as claimed in claim 14, further comprising:
said accessory kit including a powered accessory fixture coupled to the wire harness.

16. The apparatus as claimed in claim 15,
said powered accessory fixture including a light.

17. The apparatus as claimed in claim 15,
said wiring conduit presenting first and second conduit ends corresponding to the first and second endshields,
said wiring conduit being attached relative to the first endshield adjacent the first conduit end,
said powered accessory fixture being supported by the wiring conduit adjacent the second conduit end.

18. The apparatus as claimed in claim 15, further comprising:
a fan including a hub and fan blades supported by the hub,
said fan being mounted on and rotatable with the rotatable shaft, with the wiring conduit passing through the hub.

19. The apparatus as claimed in claim 1, further comprising:
a fan including a hub and fan blades supported by the hub,
said fan being operably powered by the rotatable shaft, with the wiring conduit passing through the hub.

20. The apparatus as claimed in claim 19,
said fan blades defining an outermost fan diameter dimension,
said outermost fan diameter dimension ranging from about seven feet to about twenty-four feet,
said fan being rotatable by the inner rotor motor at a fan rotational speed that ranges from about fifty revolutions per minute to about two hundred revolutions per minute.

* * * * *